US009068553B2

(12) United States Patent
McGrath

(10) Patent No.: US 9,068,553 B2
(45) Date of Patent: Jun. 30, 2015

(54) FLOATING VESSEL THAT CONVERTS WAVE ENERGY AT SEA INTO ELECTRICAL ENERGY

(71) Applicant: Ocean Renewables Limited, County Wexford (IE)

(72) Inventor: Brendan McGrath, County Wexford (IE)

(73) Assignee: Ocean Renewables Limited, County Wexford (IE)

( * ) Notice: Subject to any disclaimer, the term of this patent is extended or adjusted under 35 U.S.C. 154(b) by 159 days.

(21) Appl. No.: 13/710,792

(22) Filed: Dec. 11, 2012

(65) Prior Publication Data
US 2013/0113214 A1  May 9, 2013

Related U.S. Application Data

(63) Continuation of application No. PCT/EP2011/059637, filed on Jun. 9, 2011.

(30) Foreign Application Priority Data

Jun. 11, 2010 (IE) .................................. S2010/0379

(51) Int. Cl.
| F03B 13/10 | (2006.01) |
| F03B 13/12 | (2006.01) |
| H02P 9/04 | (2006.01) |
| F03B 13/20 | (2006.01) |

(52) U.S. Cl.
CPC ................ *F03B 13/20* (2013.01); *Y02E 10/38* (2013.01); *F05B 2240/95* (2013.01)

(58) Field of Classification Search
CPC ...... F03B 13/20; F05B 2240/95; Y02E 10/38
USPC .......................................... 290/42, 53, 43, 54
See application file for complete search history.

(56) References Cited

U.S. PATENT DOCUMENTS

| 917,411 | A | * | 4/1909 | Casella et al. ................... 60/500 |
| 1,078,323 | A | * | 11/1913 | Trull .............................. 417/332 |
| 3,204,110 | A | | 8/1965 | Masuda |
| 4,118,932 | A | | 10/1978 | Sivill |
| 4,389,843 | A | * | 6/1983 | Lamberti ......................... 60/507 |
| 4,781,023 | A | * | 11/1988 | Gordon ........................... 60/506 |
| 7,315,092 | B2 | * | 1/2008 | Cook .............................. 290/53 |

(Continued)

FOREIGN PATENT DOCUMENTS

| GB | 2113311 A | 8/1983 |
| WO | 2008135046 A2 | 11/2008 |
| WO | 2011154511 A1 | 12/2011 |

OTHER PUBLICATIONS

International Search Report and Written Opinion for PCT/EP2011/059637 issued Sep. 7, 2011; 10 pages.

*Primary Examiner* — Javaid Nasri
(74) *Attorney, Agent, or Firm* — Additon, Higgins & Pendleton, P.A.

(57) ABSTRACT

An apparatus for converting wave energy into electrical energy comprising a first floating hull (201) interconnected to a second floating hull (202). A winch mechanism for use in raising a weight suspended on a cable (14). The winch mechanism is operated in response to movement of the first hull (201) relative to the second hull (202), and a generator driven by the downward movement of the weight. Moreover, a method for converting wave energy into electrical energy.

16 Claims, 17 Drawing Sheets

(56) References Cited

U.S. PATENT DOCUMENTS

| | | | |
|---|---|---|---|
| 7,443,047 B2 * | 10/2008 | Ottersen | 290/53 |
| 7,759,813 B2 * | 7/2010 | Fujisato | 290/53 |
| 8,008,792 B2 * | 8/2011 | Gray | 290/42 |
| 8,304,925 B2 * | 11/2012 | Yang et al. | 290/42 |
| 8,358,025 B2 * | 1/2013 | Hogmoe | 290/53 |
| 8,471,397 B2 * | 6/2013 | Iglesias Rodriguez et al. | 290/53 |
| 8,508,063 B2 * | 8/2013 | Rhinefrank et al. | 290/53 |
| 2009/0322092 A1 | 12/2009 | Werjefelt | |

\* cited by examiner

FLOATING VESSEL THAT CONVERTS WAVE ENERGY AT SEA INTO ELECTRICAL ENERGY

CROSS-REFERENCE TO PRIORITY APPLICATION(S)

This application is a continuation of and claims priority to the commonly assigned International Patent Application No. PCT/EP2011/059637 (filed Jun. 9, 2011, in the European Patent Office) and the commonly assigned Irish Patent Application Serial No. S2010/0379 (filed Jun. 11, 2010, in the Irish Patent Office), both of which are hereby incorporated by reference in their entirety.

FIELD OF THE INVENTION

The present invention relates to an apparatus that converts wave energy into electrical energy.

BACKGROUND

The sustainable production of clean energy has been the subject of intense worldwide discussion for some time now, and it is clear that a great demand exists for this type of energy. The invention is designed to be a source of renewable, non polluting energy, and has the potential to commercially supply some of this demand. The invention described here will convert the available energy of wave action at sea into electrical energy.

SUMMARY OF THE INVENTION

According to the invention there is provided an apparatus for converting wave energy into electrical energy comprising a first floating hull interconnected to a second floating hull, a winch mechanism on at least one hull for in use raising a weight suspended on a cable, said winch mechanism being operated in response to movement of said first hull relative to said second hull, and an electrical generator driven by the downward movement of the weight.

Preferably the first hull and second hull are pivotally interconnected.

The winch mechanism is preferably operable to raise the weight, when the hulls pivot relative to each other, in both upward and downward directions.

Preferably a drive mechanism is provided to operate a drive shaft in one direction to raise the weight in response to relative movement of the first and second hulls.

One hull preferably has a gear segment which engages with a gear pinion on the other hull, said gear pinion engaged with said gear mechanism.

Preferably each hull has a gear segment and a gear pinion for engaging with a corresponding gear pinion and gear segment on the other hull.

The gear segments preferably have an arc of approximately 110°.

The first and second hulls are preferably pivotally connected by a link shaft.

Preferably the weight on one hull is raised, as the weight on the other hull is lowered to operate the generator.

The gear segment is preferably mounted on a flange which projects from the hull.

The pinion on each hull is preferably disposed on a front face of the hull.

Preferably each hull has a recess for accommodating the weight.

Each hull preferably comprises an upper deck (A) and a lower deck (B).

Preferably, at least the generator is disposed on the upper deck (A).

The invention further provides a method for converting wave energy into electrical energy comprising providing a first floating hull interconnected to a second floating hull, and a winch mechanism for in use raising a weight suspended on a cable, said winch mechanism being operated in response to movement of said first hull relative to said second hull, and a generator driven by the downward movement of the weight.

The basis for the invention is to produce a consistent energy output when exposed to wave action particularly at sea. As it will be necessary for this apparatus to endure for long periods of time and perform effectively in a harsh marine environment, the floating hull upon which this system operates is designed in the manner of a ship's hull. This design can therefore be readily scaled up to the size of a very large vessel, depending upon the application required, ensuring that an exceptionally high level of seaworthiness and endurance is achieved. There are significant advantages to be gained in the building and design of this invention by drawing on the resources of proven ship design technology such as can be integrated into this design.

One notable feature of this invention is that it does not use a hydraulic system to perform its main function, and therefore presents a much reduced risk of pollution damage to the environment.

In unmanned machines where large volumes of hydraulic fluids are central to their operation, a constant threat of pollution would exist where the failure of a high pressure pipe or seal, or indeed a total loss of the machine at sea, could result in the spillage of large quantities of hydraulic fluid. This design will need only small quantities of well contained lubricants and these can be specialized to reduce the risk of contamination.

Environmental impact is further reduced due to the absence of any submerged machinery that is rotating or exposed and hazardous to marine life.

Preferably, there is provided a drive mechanism which is operated by the relative pivotal movement of the first and second hulls. The drive mechanism is connected to and operates the winch mechanism to raise the weight suspended on the cable.

The first and second hulls are preferably pivotally connected by a link shaft. Preferably, there is provided a starboard link shaft which is fixed to the first hull and a port link shaft fixed to the second hull.

In one embodiment each link shaft has preferably mounted thereon a gearwheel engaged with another gearwheel on a primary drive shaft.

Further the link shaft has mounted thereon a further drive member connected by a rod to a sprag clutch operated drive gear on the main drive shaft.

The gearwheel and drive members connecting the link shaft to the main drive shaft operate in such a way as to rotate the primary drive in a chosen direction.

It will be noted that the pivotal movement of say the second or aft hull in both the upward and downward direction as it is crossed by a wave, results in rotation of the primary drive shaft in the same direction.

The primary drive shaft is therefore rotated in response to relative pivotal movement of the first (forward) and second (aft) hulls, caused by wave action, and rotation of the primary drive shaft enables rotation of the winch mechanism to raise a cable and weight.

The raising of the weight is therefore the conversion of kinetic energy of the waves to potential energy (or gravitational energy) as the weight is raised to a position on the underside of the hull.

The mechanism on both the fore and aft hulls is identical, and it may be arranged that while one hull is raising the weight to its uppermost position, the weight on the other hull may be released to generate power through the generator.

The stored potential energy of the raised weight is therefore converted to electrical energy by the release of the winch mechanism to enable the weight to fall downwardly and the electrical generator is operated.

The apparatus of the invention will be operated in a suitable depth of water perhaps of the order of 60 meters.

It is possible that a plurality of similar hulls according to the invention may be connected together.

Embodiments of the invention will now be described by way of example with reference to the accompanying drawings in which:

BRIEF DESCRIPTION OF THE DRAWINGS

The invention will be more clearly understood from the following description of some embodiments thereof, which are given by way of example only, with reference to the accompanying drawings, in which.

DETAILED DESCRIPTION

Figure 1:
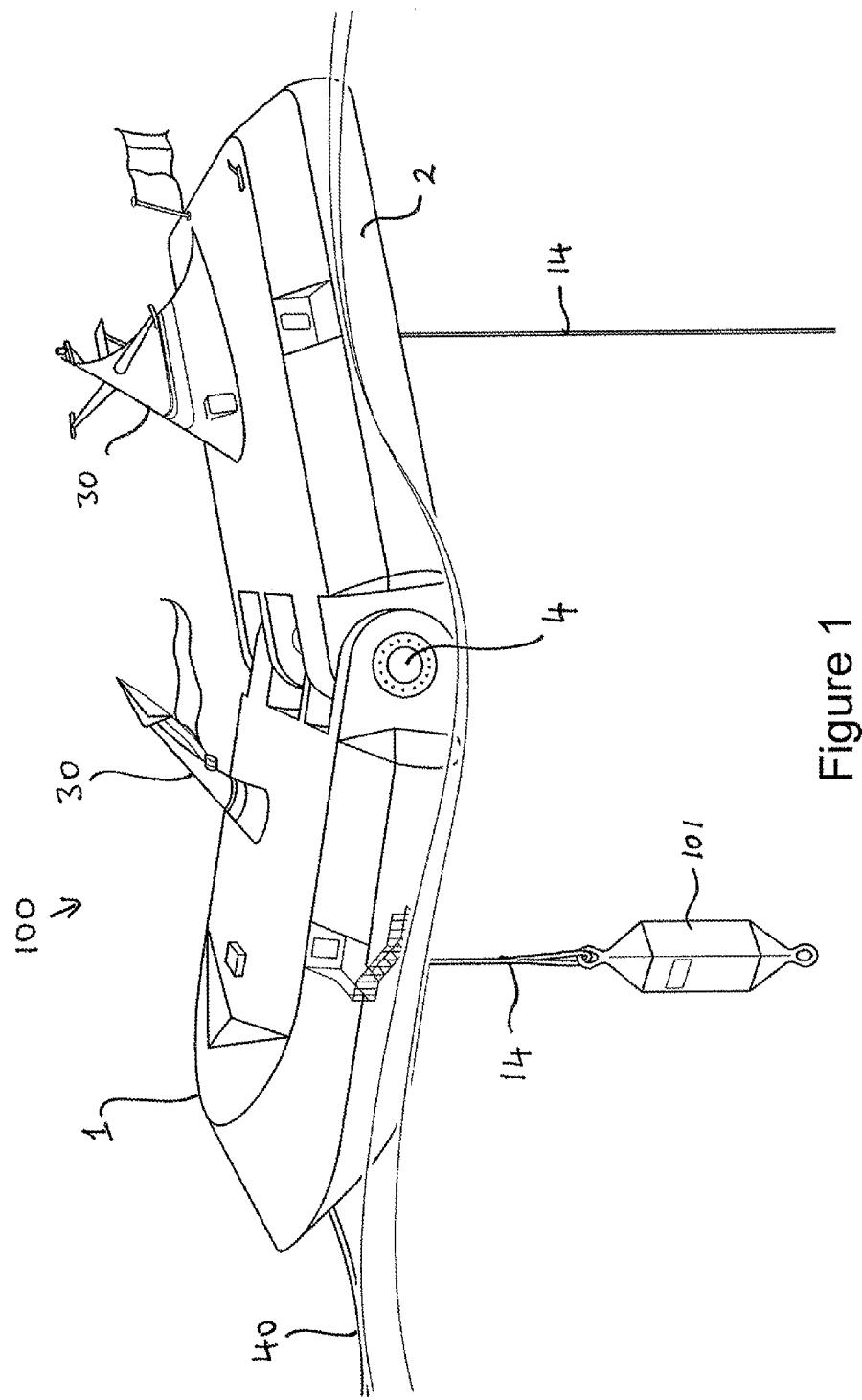
FIG. 1 is a perspective view of an apparatus for converting wave energy into electrical energy according to the invention.
Figure 2:
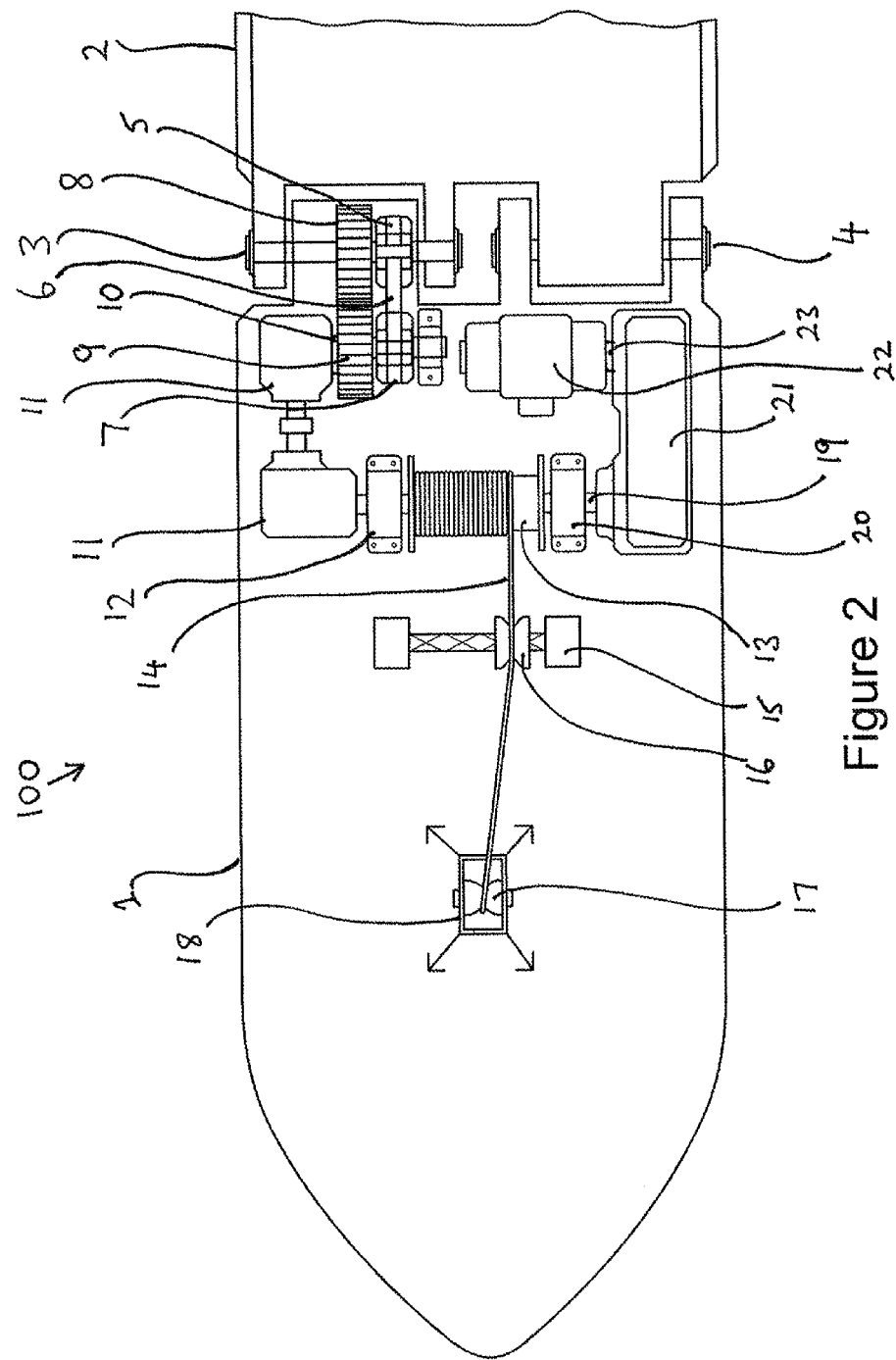
FIG. 2 is partial schematic top plan view of the apparatus of FIG. 1.
Figure 3:
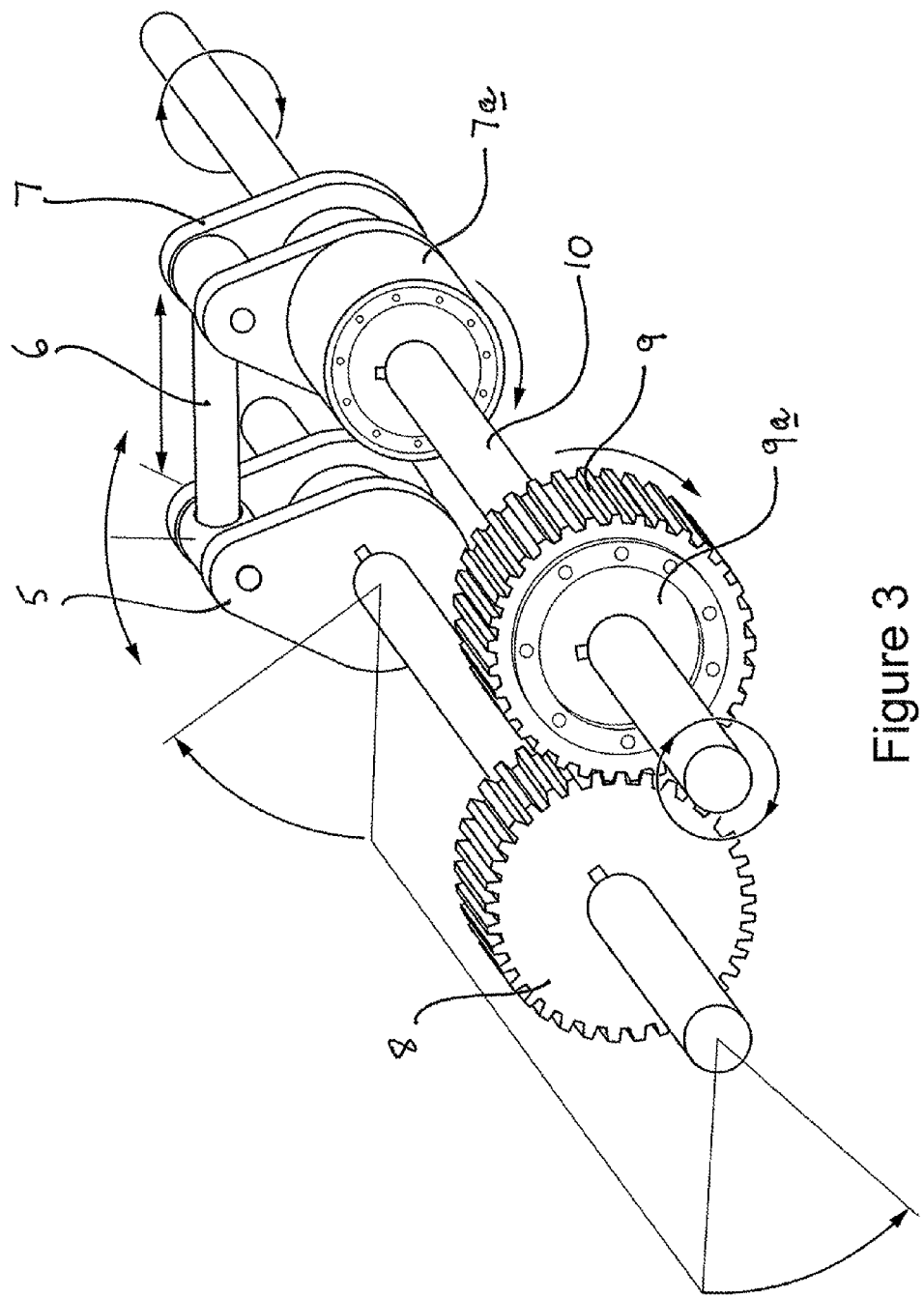
FIG. 3 is a schematic view of part of the drive mechanism of FIG. 1.

Referring now to the drawings and referring in particular to FIGS. 1-3 there is shown therein an apparatus for converting wave energy into electrical energy generally indicated at 100. The apparatus 100 comprises a first or forward hull section 1 and a rear or aft hull section 2. The hull sections 1 and 2 are pivotally connected together by link shafts 3, 4. The link shaft 3 is the starboard link shaft and is fixed to the aft hull section 2. The link shaft 4 is the port link shaft and is fixed to the forward hull section 1. Thus, the aft hull section 2 can rotate or pivot about the link shaft 4 whereas the forward hull section 1 can rotate or pivot about the link shaft 3.

The link shaft 3 has mounted thereon a gearwheel 8 connected to a gearwheel 9 mounted on a primary drive shaft 10. Further, the link shaft 8 has fixed thereon a lever member 5 and the primary drive shaft 10 has fixed thereon a lever member 7. A connecting rod 6 is connected to lever members 5 and 7.

The gearwheel 9 has a sprag clutch mechanism 9a (FIG. 3) which permits rotation of the gear wheel 9 (and thus the primary drive shaft 10) in one direction and the lever member 7 has a sprag clutch mechanism 7a which also permits rotation of the primary drive shaft 10 in the same direction. Therefore, as the aft hull section 2 pivots upwardly relative to the forward hull section 1, the gear wheel 9 and primary drive shaft 10 is rotated in one direction and as the aft hull section 2 pivots downwardly relative to the forward hull section 1, the cam member 7 rotates the primary shaft 10 in the same direction. The sprag clutch mechanisms on gear wheel 9 and lever member 7 enable the rotation of primary drive shaft 10 in the same direction, as the aft hull section 2 moves upwardly and downwardly relative to the forward hull section 1. Therefore, continuous rotation of the primary drive shaft 10 is achieved as the hull sections are raised and lowered as a wave passes under the hull sections.

The primary drive shaft 10 is connected to a drive system comprising a pair of gearing mechanisms 11 which in turn are connected through a drive clutch and brake 12 to a winch spool 13. The winch spool 13 has wound thereon a warp or cable 14 which is fed over a spooling roller 16 mounted on a spooling mechanism 15. The cable 14 extends over a final roller 17 mounted in an enclosed section 18 having an aperture (not shown) through which the cable 14 extends downwardly below the hull section 1. A suitable weight 101 is attached to the free end of the cable 14. It will be appreciated that the enclosed section 18 is designed to enable the cable 14 to exit the hull 1 through an opening but not compromise the hull 1 in relation to its sea worthiness, to ensure the hull will not flood with water.

A secondary drive shaft 19 is attached to the winch spool 13 and is mounted on a secondary drive clutch and brake 20. The secondary drive shaft 19 is connected to a secondary step up gearing mechanism 21 which in turn has an output shaft 23 connected to an AC generator 22.

It will be appreciated that the aft hull 2 will have a similar arrangement of gearwheels, link shafts, winch spool and winch cable 14 and weight 101 as the forward hull 1, so that the forward and aft hulls operate on a weight 101 in a similar manner.

This system makes full use of the depth of water in which it operates, the distance between the vessel and the seabed is fully utilized as part of the central function of this design.

This system converts wave energy into an accumulated gravitational force which is then controlled and deployed smoothly to power an AC generator.

The buoyancy of the hull sections and how they react to wave motion, will determine the force that they can bring to bear on the mechanical components involved in the production of this power, and therefore the efficiency of their power production.

The size and stability of the hulls 1, 2 will enable certain fundamental types of repairs to be carried out at sea whilst on station, reducing downtime and the cost of essential maintenance.

All of the components parts of this design, and in particular those which will enable it to endure at sea and produce electrical energy, are extremely reliable and capable of enduring the harshest conditions at sea.

This device, once deployed will produce power smoothly because the generators 22 will be driven at a constant speed. This will be an advantage over many designs such as air driven turbines and other machines which tend to produce power in surges making grid connection more complex and expensive.

This invention is designed in the manner of a vessel or ship floating on station and anchored on the open sea, in such a way as to allow available wave energy to be converted, by means of incorporated machinery, into electrical energy. The resultant electricity will then be fed into the national grid by cable and conventional systems.

This invention may be comprised of more than two hull sections, and all of these sections will be designed and constructed using the most up to date shipbuilding techniques of ocean going steel hulled ships. All hull sections will be joined or connected together by means of horizontally aligned hinge systems these will be very robust and highly engineered to allow the hull sections to partially rotate in the vertical plane relative to each other.

While a number of hull sections may be used in any one application, a minimum of two sections will be necessary. For the purposes of this description we will refer to an apparatus that operates using the minimum requirement of two hull sections. The apparatus described here can be said to be "in two half's" and hinged or joined roughly around the middle of its length. A propulsion system for the apparatus may or may not be used and would in any event be superfluous to its main function of wave energy conversion which it will perform while stationary.

During its period of operation the apparatus will be anchored from a single point to geographically fix its position and also in such a way as to enable it to naturally establish an alignment which will result in the waves moving towards and along the hull sections at right angles to them, as would be normal with an anchoring arrangement of this type.

The forward section 1 of the vessel, which would constitute the bow section, will be at all times standing into the waves and fastened directly to an anchor/mooring system 40, 50, (fixed to the seabed) this forward section 1 will be designed and built having a suitable streamlined bow shape.

Once positioned and exposed like this to wave action on the open sea, the hulls of the apparatus will respond to this wave action by producing an alternating, semi rotational movement in the vertical plane, with the connecting hinge axis (4, 3) forming the centre of this movement.

The following stage is the process whereby the vessels alternating movement, as described above, is converted into useable energy via the installation on each hull of the arrangement of shafts, sprag clutches, connections and gearing, (described above) that are powered by the interacting motion of the hull sections through the hinge axis shaft. This enables the partial rotation of the hull movement to be mechanically developed into a fully rotational movement. This installation will be double acting and will have a shaft on each hull which can fully rotate in one direction only.

Each hull section will have one fully rotating shaft 10, which are the primary drive shafts. The rpm of each primary shaft 10 will be low and somewhat inconsistent depending on the frequency and amplitude of the waves, however each shaft will be capable of substantial power output due to the leverage the hull sections can bring to bear on the hinge centre shafting 3, 4 as the vessel reacts to the wave action.

Each of these primary drive shafts 10 will be coupled to identical winch installations that have been located in alignment together on the deck of each hull section, as described above.

The winches 13 have a single spool with dimensions appropriate to the application, fitted with heavy duty air/electric clutch and braking systems 12, 20 and capable of being controlled and operated electronically. The winch is fitted with a sufficient quantity of high specification cable/warp 14 on the spool to take into consideration the depth of water in its proposed working location at sea.

The requirement being that each warp 14 is of sufficient length to reach to just above the sea bed from the surface in that location. In one embodiment the design may require that a depth of at least sixty meters is available, this minimum depth may to facilitate the operational sequence, and also wave action at this depth is ideally suited. Depths of less than sixty meters may need to be facilitated by the inclusion of a double purchase arrangement which would increase the length of warp and require the weight to be increased by double the amount also. Depths of much more than sixty meters would also be suitable with the anchoring system requirements being scaled up to take into consideration the increase in water depth.

Further to the winch installations, in both cases the warps 14 will lead out from each winch spool to which they are attached, via a system of blocks and rollers, to positions that have been calculated to optimise the stability and buoyancy of each hull. From these positions the warps will lead vertically down through each hull section, via watertight enclosures which will not compromise each hulls sea-keeping capability, and thereby into the sea where underneath the floating hull the weight 101 is attached to each warp end.

The layout and arrangement of the mechanical systems as described above will convert the wave energy that the vessel is exposed to into a system that will supply power to the winches; thereby enabling each winch to raise the weight attached to them from the lowest point of the sequence, just above the sea bed and clear of it, to the uppermost point of the sequence, a point just below the underside of each hull. In this manner the apparatus will operate with at least one winch on each hull section, and at least one weight per winch. The weights will preferably be of equal mass and be determined in each case by the particular application and scale of the machine to be operated.

In addition each winch spool is fitted with two clutches, one on either side of the spool as follows; a primary clutch 12 which will allow each spool 13 to be either disengaged from or engaged with its drive or input shaft from the gearing mechanism 11, and a secondary clutch which will allow each spool to be disengaged from or engaged with its output shaft.

The clutches will operate in an alternating sequence; when a winch spool is being driven by its primary input shaft with the primary clutch 12 engaged and in the progress of lifting its attached weight, the output clutch, or secondary clutch 20, will remain disengaged. When the spool 13 has finished lifting the attached weight the primary clutch 12 will disengage the spool 13 from the primary drive shaft and the secondary clutch 20 will take over to engage the spool with the secondary or output shaft 19.

Each winch system therefore will be designed and built to perform two separate functions with one function being operated at a time in a specific sequence. The first sequence, which is the stage which accumulates the energy drawn directly from the wave action, will begin when the winch spool 13 with its braking system released and primary clutch 12 engaged and powered by its respective primary input shaft, will begin to raise its attached weight from where it will be suspended, i.e. just above and clear of the seabed which is the lowest point of the sequence, to a point just below the floating hull which is the uppermost. During this procedure as the weight is being raised by its spool from this lower position the attached cable 14 is taken in tight coils and being wound on to the winch spool 13 until the weight has reached the uppermost predetermined position just below and clear of the hull 1.

A winch spool 13 with its weight suspended from it, in this uppermost position has accumulated energy in the windings of the warp as it was coiled around the spool, and is "loaded" with a source of gravitational power or potential energy which it has acquired during the course of its vertical travel to this uppermost point and this energy is now available to be worked in a controlled manner.

The second sequence is where this accumulated potential energy is deployed in a controlled manner in order to generate electrical power, and this sequence will be activated immediately after the weight has been raised to this uppermost position. The activation of this sequence is initiated by the operation of both the primary 12 and secondary 20 clutches in conjunction with the braking system in the following manner. The brake will be applied to momentarily secure the spool 13 and not allow it to rotate, simultaneously in a coordinated action the primary clutch 12 will be disengaged from the primary drive shaft and the secondary clutch 20 operated to engage the "loaded" spool to its secondary or output shaft 19. Release of the brake will now "clear" the spool allowing the weight to begin its descent with the spool 13 now coupled to the secondary or output shaft 19 via the secondary clutch 20, enabling the spool to rotate the secondary shaft. The secondary shaft will transmit this power from the spool through a step-up gearbox 21 adding shaft speed sufficient to run the AC generator 22. As gravity takes the weight on this descent to its lower position as previously outlined; the action of this descent will cause the spool to rotate as the gravitational force of the descending weight unwinds the cable from around the spool. This descent will be actively controlled by means of an energy producing braking system, or an electronic governing system which can momentarily increase the electrical load on the generator so that a constant rpm may be achieved without wasting power.

As previously mentioned this description relates to a version of this design that will operate using two joined hull sections, each section having its own shafting, winch, weight, step-up gearing and AC generator installations. During its operation and in order to achieve a continuous output of electrical energy from the vessel as a whole, each hull section will be continuously coordinated with its neighbour in an alternating sequence of power production. That is to say that while one hull section is in its sequence of raising its weight and therefore not producing electrical power its adjoining hull section will be in a sequence of generating power with its weight descending. This alternating sequence would be repeated pro rata for versions of this design that are operated using more than two joined hull sections.

Figure 4:
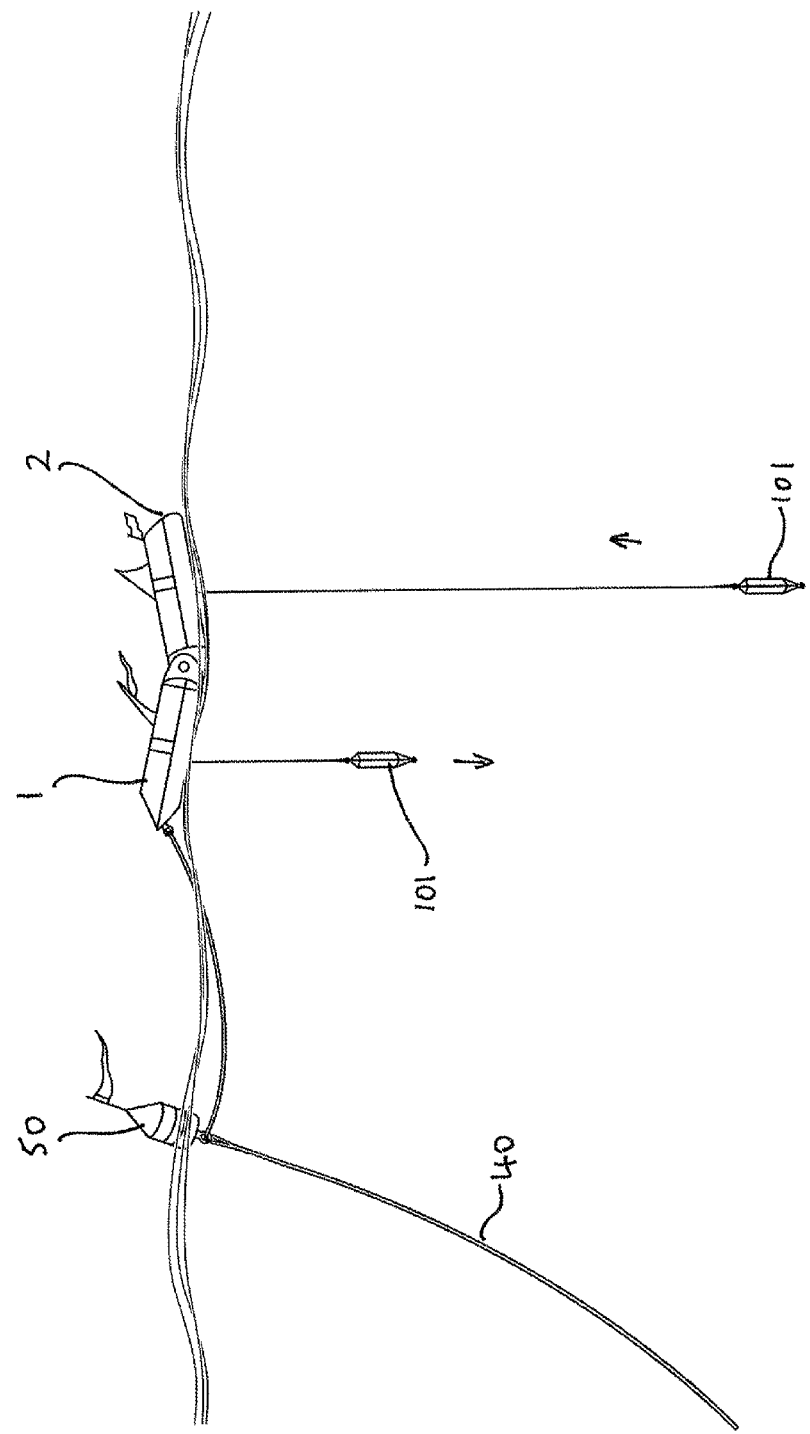
FIG. 4 is a schematic view of the apparatus of FIG. 1 in use.
Figure 5:
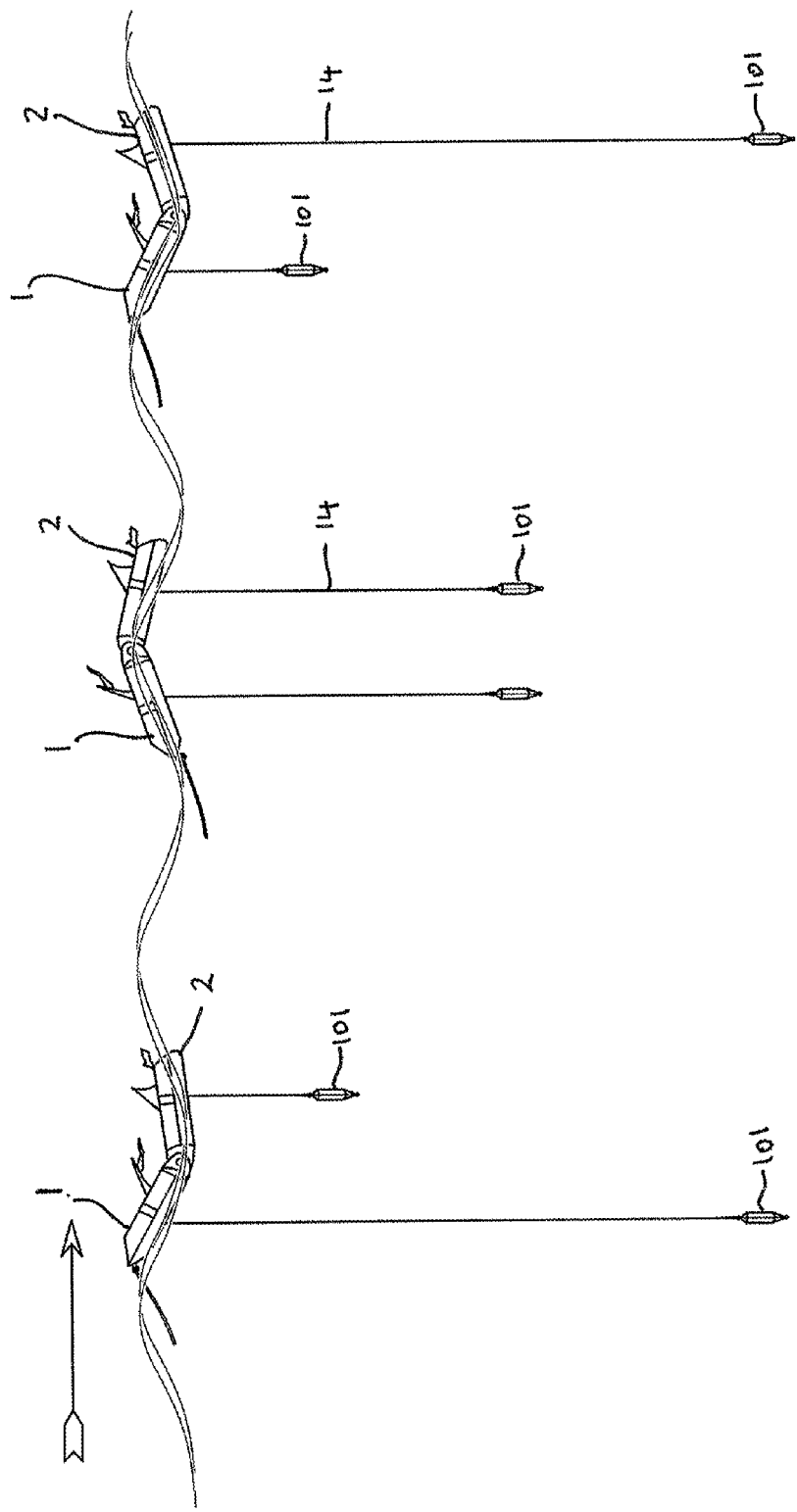
FIG. 5 is a further schematic view of the apparatus in use.

In FIGS. 4 and 5 there is shown various stages of operation of the system, illustrating how the forward and aft hull sections 1, 2 pivot upwardly and downwardly relative to each other as waves pass underneath them. As one weight 101 reaches the uppermost position the other weight 101 is in the lowermost position.

It will be understood that the aft hull section 2 will have the same equipment as forward hull section 1 and will operate in the same way. As shown in FIG. 1 each hull section 1, 2 may have a fin 30 to increase stability and maintain the hulls 1, 2 pointing into wind. The hull 1 will be provided with an anchor line 40 which may be attached to a marker buoy 50 and the anchor line secured to the seabed.

Figure 6:
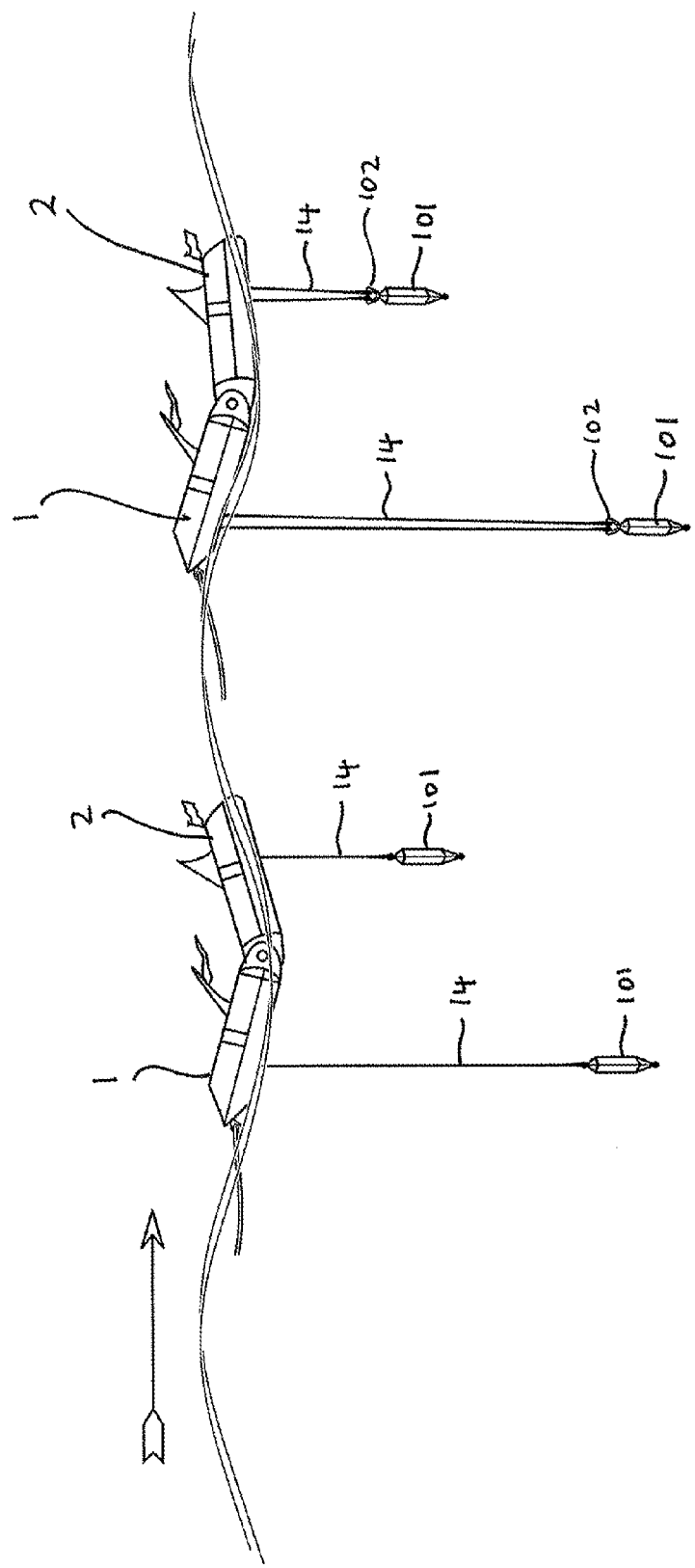
FIG. 6 is a further schematic view of the apparatus in use.
Figure 7:
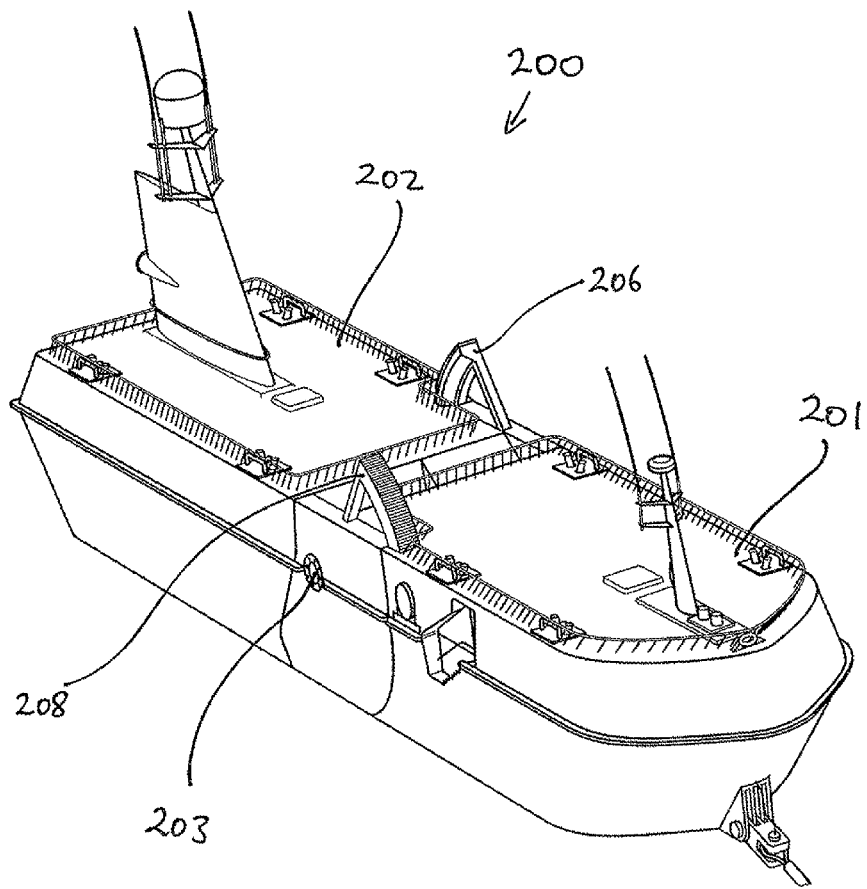
FIG. 7 is a perspective view of another embodiment of apparatus for converting wave energy into electrical energy according to the invention.
Figure 8:
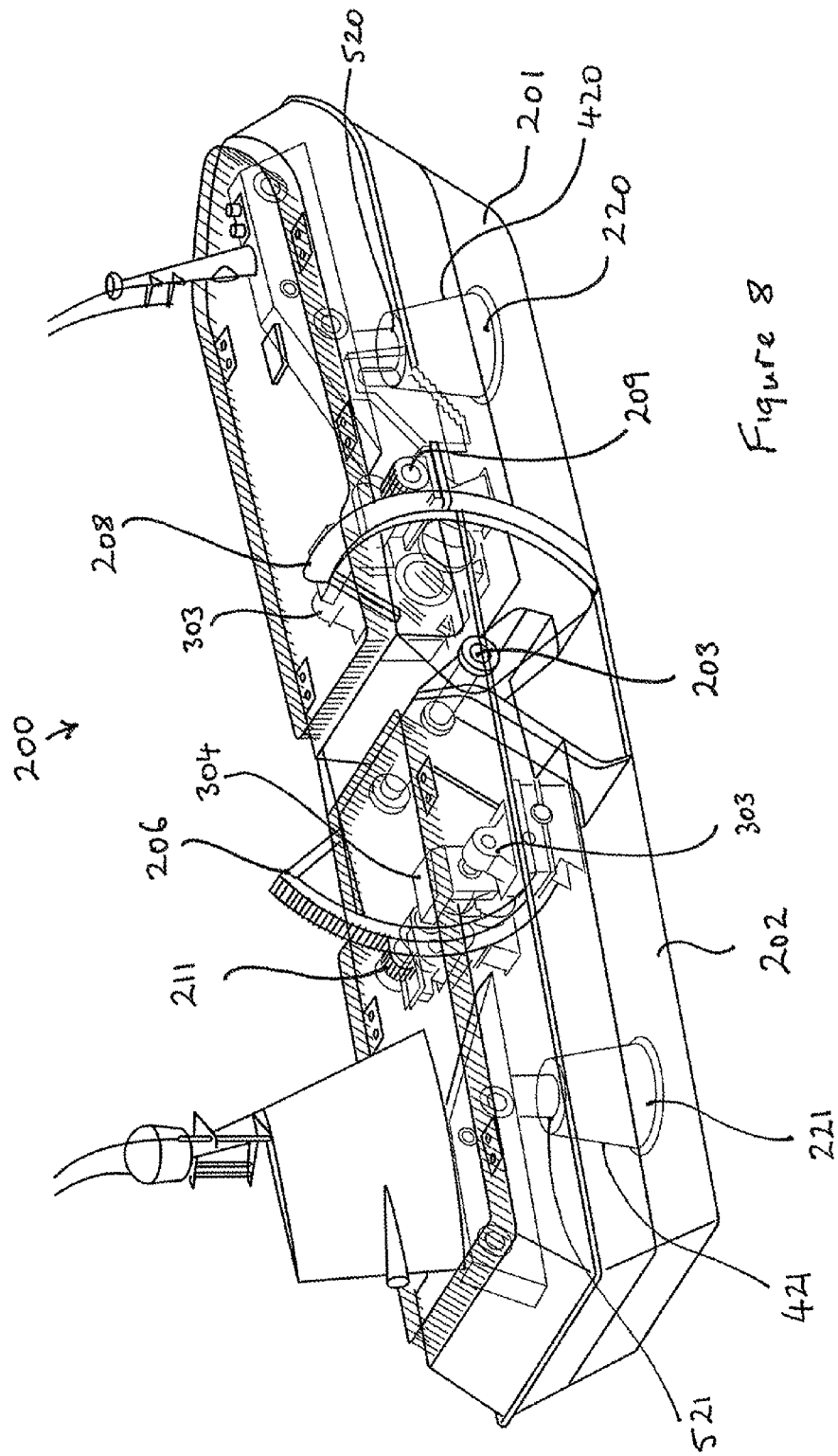
FIG. 8 is a partial transparent view of the apparatus of FIG. 7.
Figure 9:
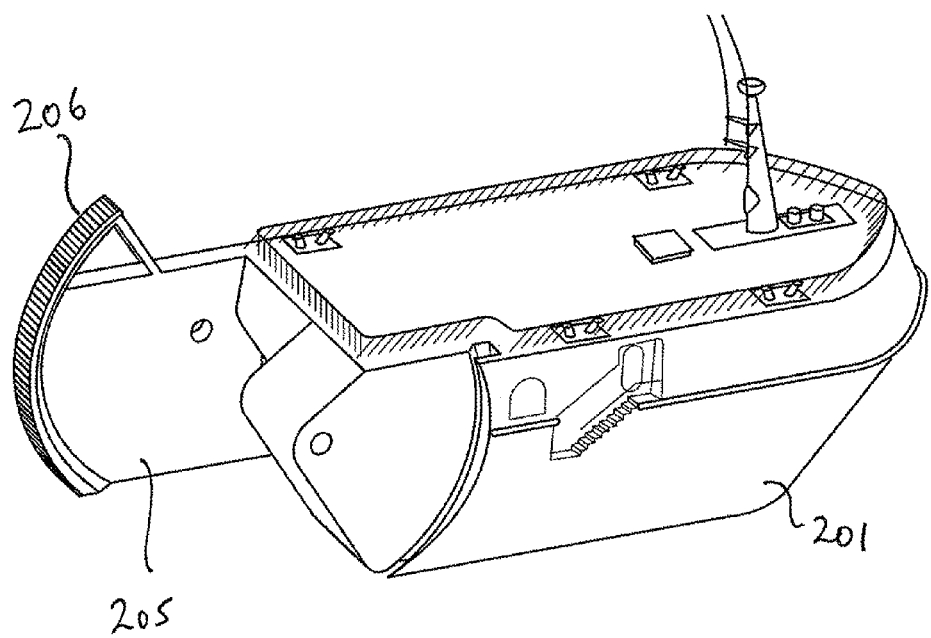
FIG. 9 is a perspective view of the front hull of the apparatus of FIG. 7.
Figure 10:
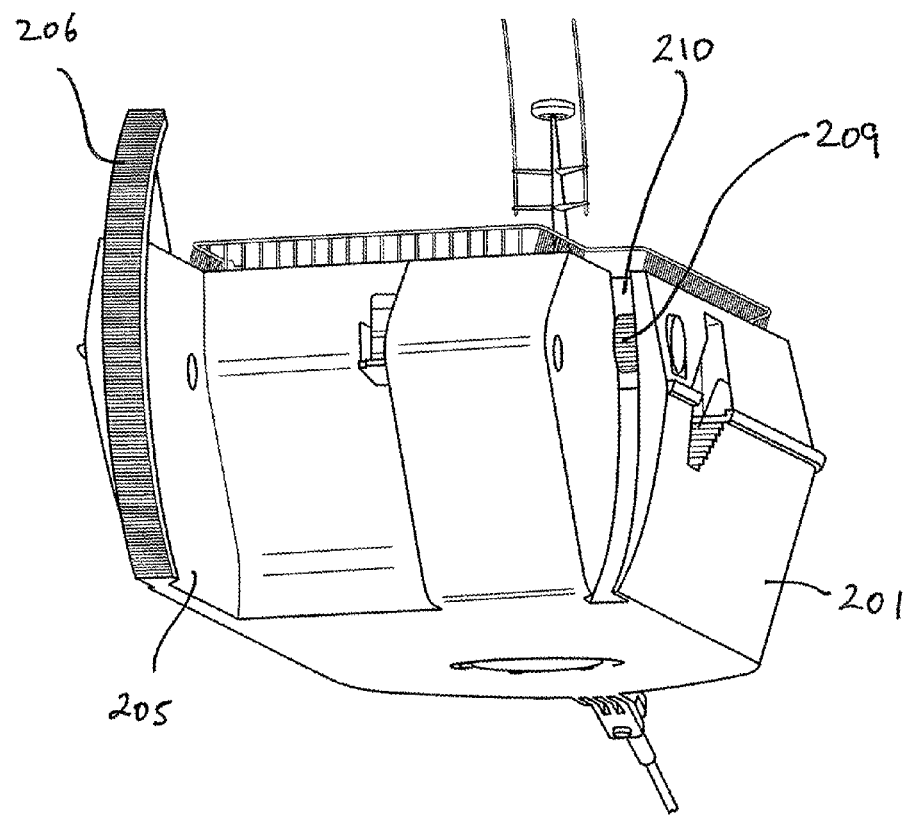
FIG. 10 is a further perspective view of the front hull of FIG. 7.
Figure 11:
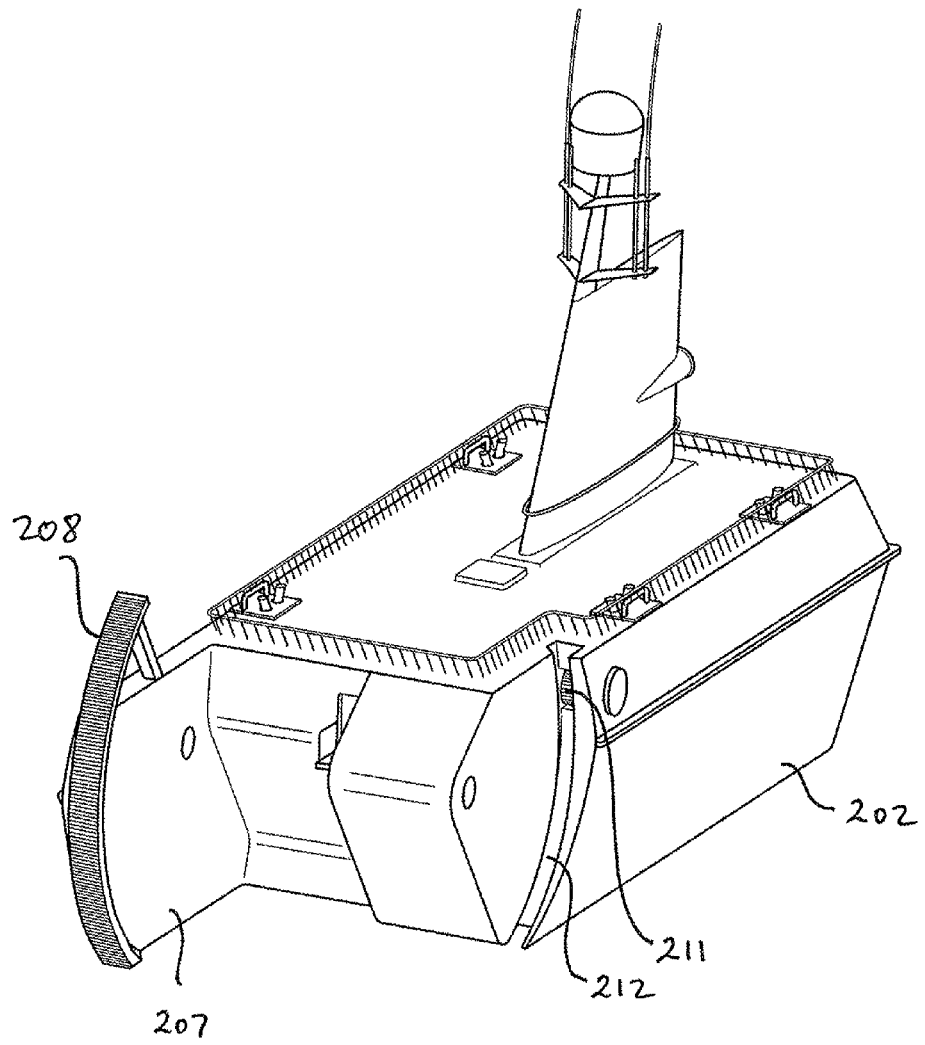
FIG. 11 is a perspective view of the rear hull section of FIG. 7.
Figure 12:
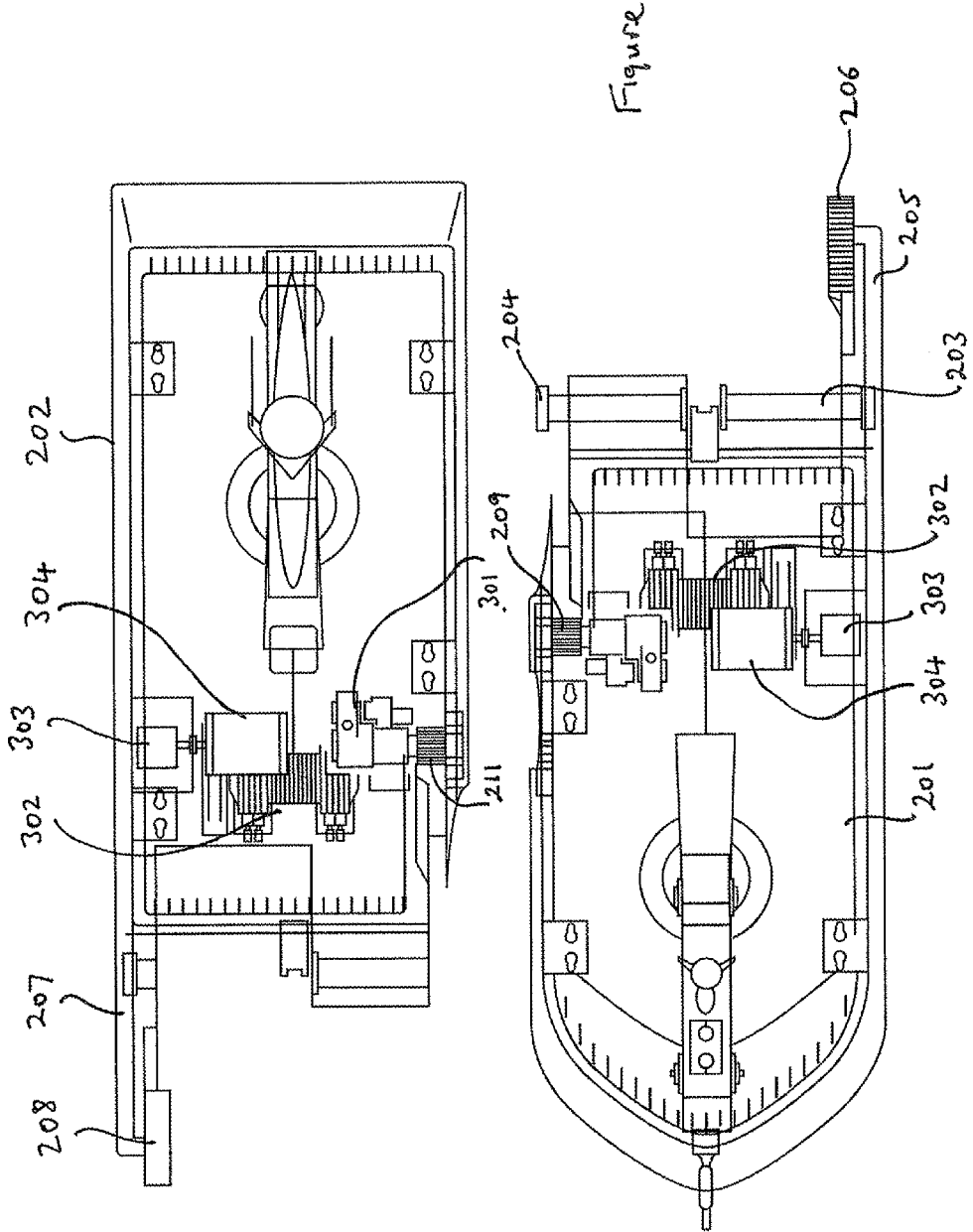
FIG. 12 is a schematic top plan view of the front and rear hull sections of the apparatus.
Figure 13:
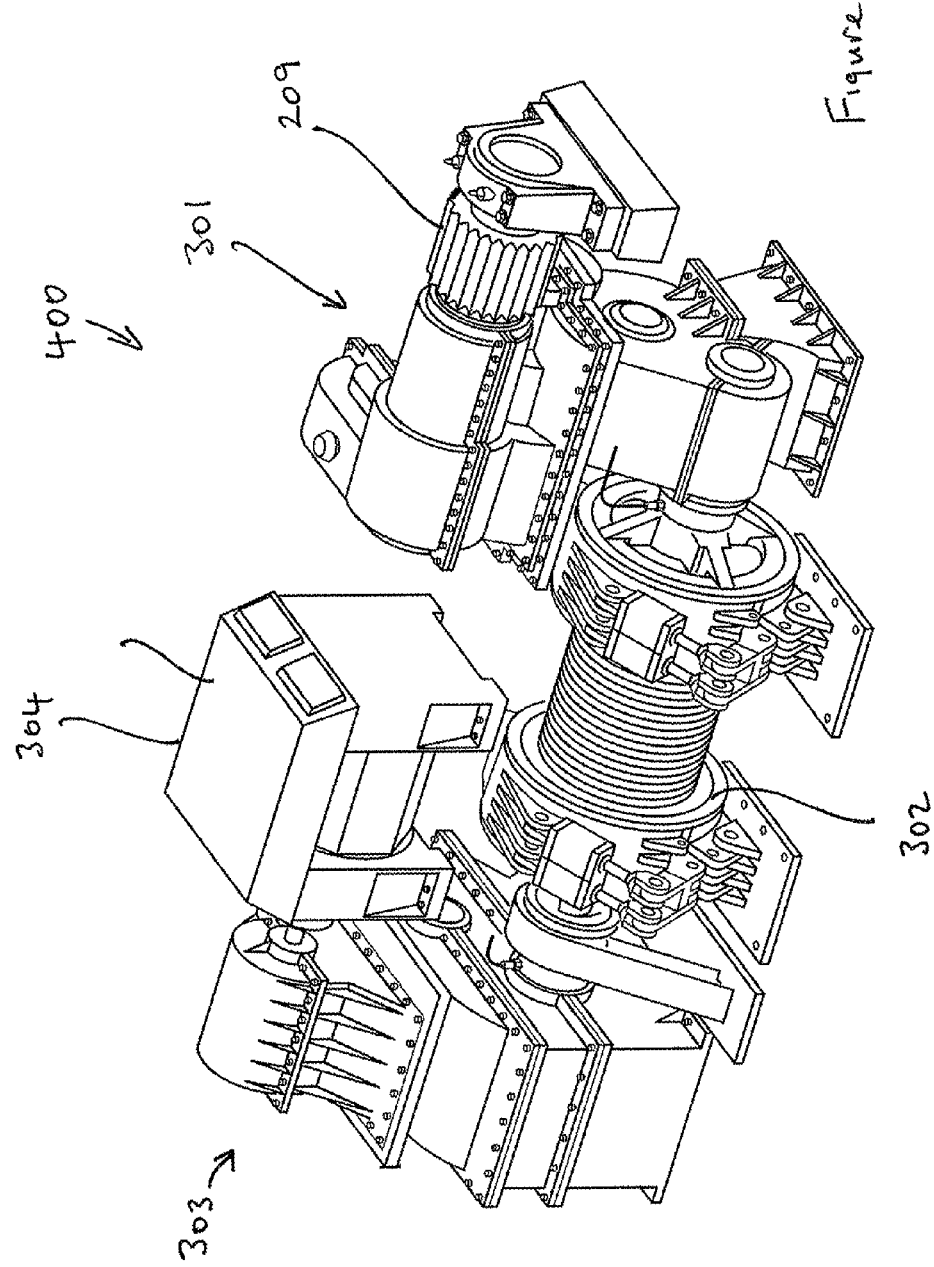
FIG. 13 is a schematic perspective view of the operating components of the apparatus of FIG. 7.

The apparatus may be fitted with a double purchase system (FIG. 6) having a pulley block 102 after the main warp 14 has led out of the hull which would allow for an increased length of warp to be used in a lesser depth of water. This would of course mean that the weights 101 would need to be increased to twice that of a single purchase installation, in short it is an option for depths of less than sixty meters.

Referring now to FIGS. 7 to 18, there is shown therein another embodiment of apparatus for converting wave energy into electrical energy, generally indicated at 200. The construction and operation of this second embodiment of the invention is many ways similar to that of the first embodiment however, the important technical differences will be discussed below.

The apparatus 200 comprises a first or forward hull section 201 and a rear or aft hull section 202. The hull sections 201 and 202 are pivotally connected together by link shafts 203 and 204 so that the forward and rear hull sections 201 and 202 can pivot relative to each other.

The forward hull section 201 has a flange 205 which carries a geared segment 206 and the rear hull section 202 has a flange 207 which carries gear segment 208. Further, the forward hull section 201 has a pinion gear wheel 209 exposed in its face 210, this gear pinion 209 engaging with gear segment 208 on the rear hull 202. Similarly the rear hull section 202 has a pinion gear 211 on its face 212, this gear pinion 211 engaging with gear segment 206 on the front hull 201.

As the hulls 201, 202 pivot relative to each other, as a wave passes under the apparatus, the gear segment 208 causes rotation of the pinion 209 and the gear segment 206 causes rotation of the pinion 211.

The pinions, 209 and 211 are each, connected to a respective drive and power take off system for raising and lowering a weight 220 and 221 respectively on each hull 201, 202.

The drive and power take off and power transfer system 301, one per hull section will now be described.

First, it is to be noted that each hull section 201, 202 will have an upper deck (A) and a lower deck (B). Referring to FIGS. 13-16, the overall drive system 400 comprises a power take off/primary transfer system 301, a winch spool 302, and a gear drive system 303 for an electrical generator 304. The power transfer system 301, provides rotational power to a drive shaft 250 for the winch spool 302 and rotation of the drive shaft winds in a warp/cable 14 to raise a weight 220 which is suspended beneath the hull section 201. When the weight 220 has been fully raised, it can be lowered again under gravity by releasing a brake on the spool 302 which in turn rotates an output shaft 310 to drive the electrical generator 304 via the step up gear drive system 303. The weights 220, 221 have a corresponding recess 420 and 421 on the underside of each hull and each recess 420, 421 has a corresponding sealed aperture 520, 521 for outlet of the cable/warp 14.

Figure 14:
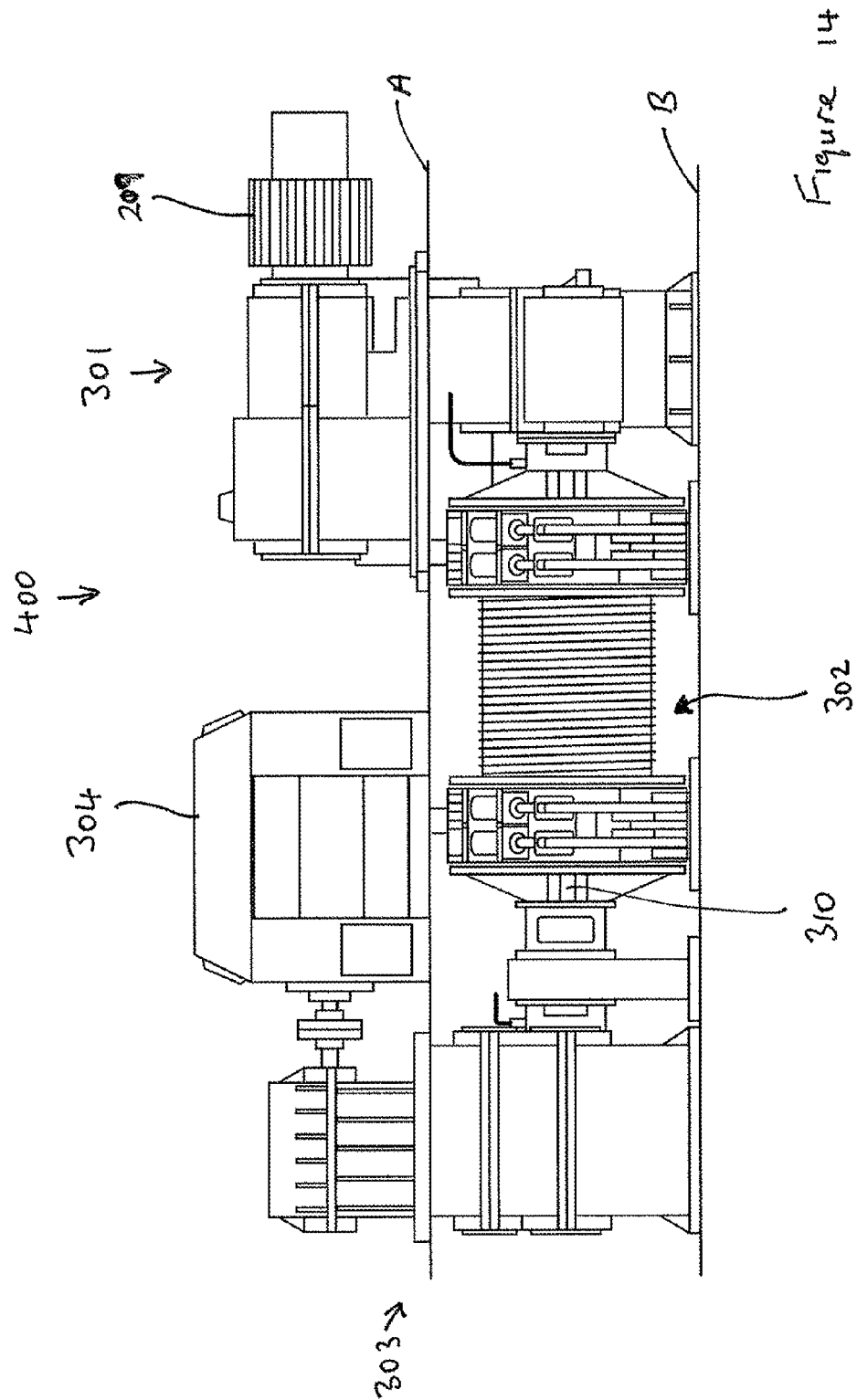
FIG. 14 is a schematic sectional view of the operating components of FIG. 13 located on the front hull of the apparatus of FIG. 7.
Figure 15:
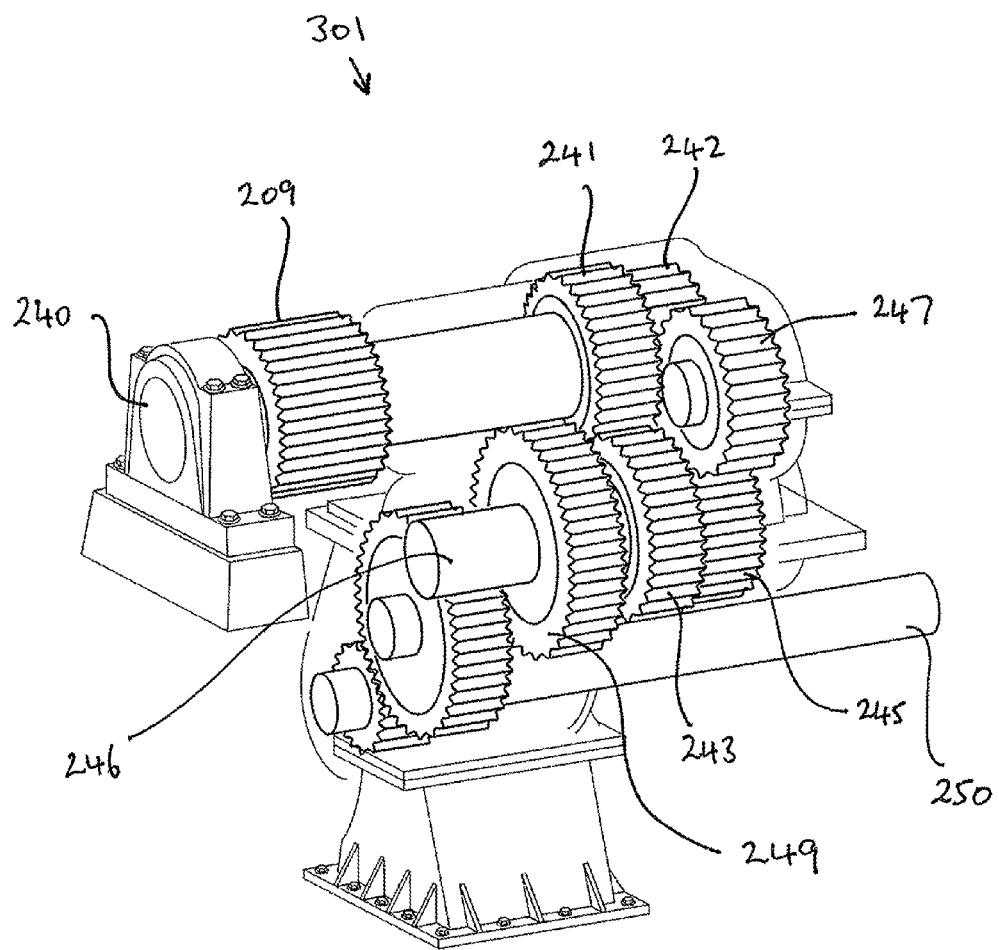
FIG. 15 is a perspective view of the power take off system of the apparatus.

As shown, the power transfer, storage and electrical generator are arranged so that the complete apparatus is spread over the two internal decks (A) and (B). As shown in FIG. 14, part of the power take off system 301, and part of the gear drive system 303 for the generator 304 are located on the upper deck (A). A very small quantity of water may be carried on board with the cable 14, each time a weight is raised so the spool 302 is placed below the generator deck (A), and sealed off from the main electrical equipment. Any water ingress due to the cable will be minimised by the way the cable is righted on board, collected in a bilge and periodically discharged overboard via low voltage automatic pumps.

The power take off 301 has a top section mounted on the upper deck (A) this being the PTO primary and secondary shafting. The primary shaft (FIG. 15) 240 has mounted thereon the pinion 209 and has two further gears 241 and 242 which drive pinions 243, 245 on secondary shaft 246. The secondary shaft pinions 243 and 245 are fitted with sprag clutches which transfer torque in one direction only, one pinion 243 being driven directly by the primary shaft gear 241 while the other pinion 245 is driven indirectly by the primary shaft gear 242 through the idler gear 247, this arrangement being used to rectify the direction of rotation of the secondary shaft. Since the pinion 209 is rotated in response to pivotal movement between the two hulls 201, 202, the reacting hulls effectively transfer oscillatory motion of the primary shaft 240 into a one directional rotation in the secondary shaft 246. The one directional torque of the secondary shaft 246 is then transferred further by the fixed gear wheel 249 through further step up gearing which is combined within the PTO casing and below the upper deck level. The additional step up gearing drives the spool input shaft 250.

In one example, the PTO velocity, gearing and dimensions are:

Gear Segment 206, 208 pitch circle diameter=16.250 meters

PTO input shaft pinion 209 pitch circle diameter=1,300 mm

PTO input shaft diameter 204 for 1 MW 2 rpm=850 mm

With a wave height and period of 2 meters and 8 seconds respectively the velocity of the hulls at their circumference will equal 0.5 meters/sec, this equates to 0.16 rpm.

The gear segments 206, 208 are rotating at 0.16 rpm, the gear up ratio to the PTO input pinion=1:12.5. The PTO pinion 209 and input shaft 240 will rotate at 2 rpm in each direction during pitch and heave.

It is envisioned that in one embodiment, the gearing produces a step up ratio of 1:5 between the PTO primary shaft 240 and the spool input shaft 250.

In the scenario where the device is reacting to wave activity as previously mentioned of 2 meters 8 seconds the winch spool input shaft will be rotating at an average speed of 10 rpm. The winch spool core circumference will measure 6 meters and when rotating at 10 rpm it will wind the cable at a linear rate of 1 meter/second.

Figure 16:
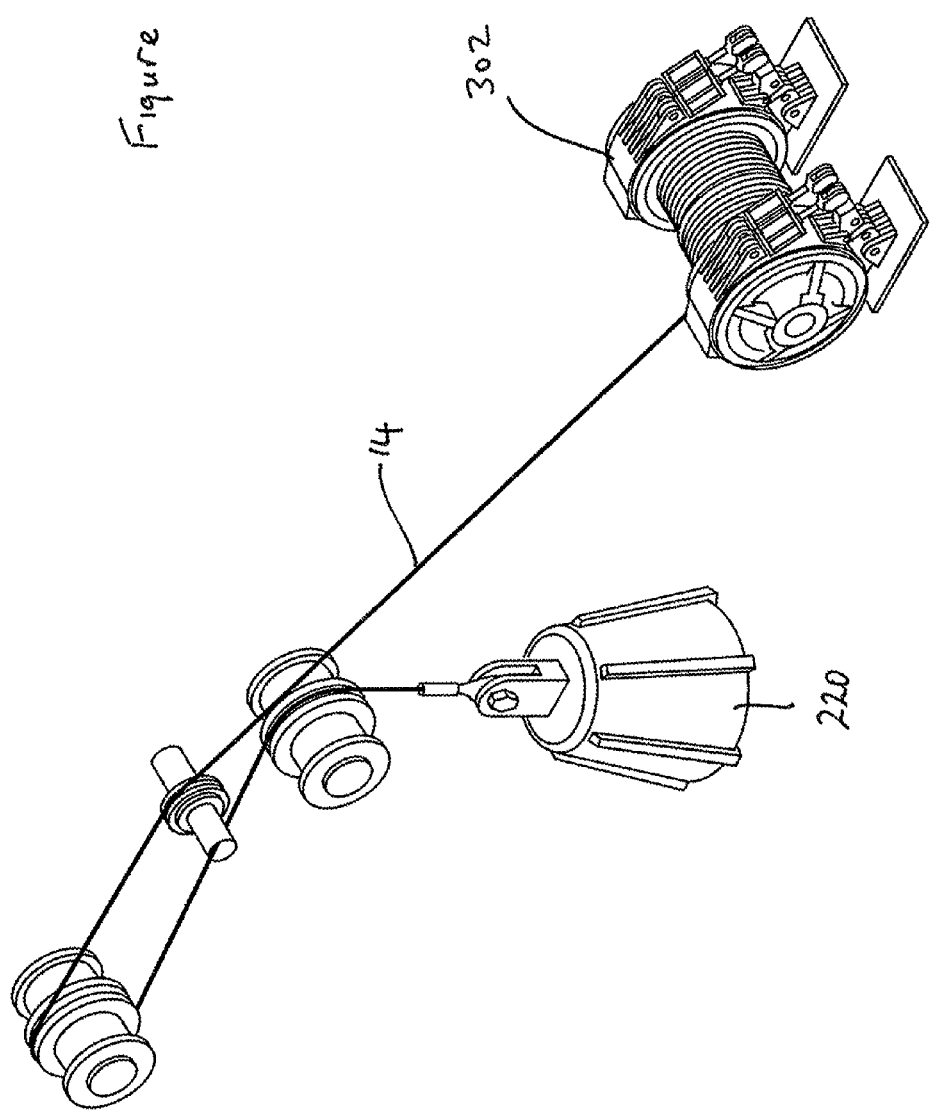
FIG. 16 is a perspective view of the winch mechanism of the apparatus.
Figure 17:
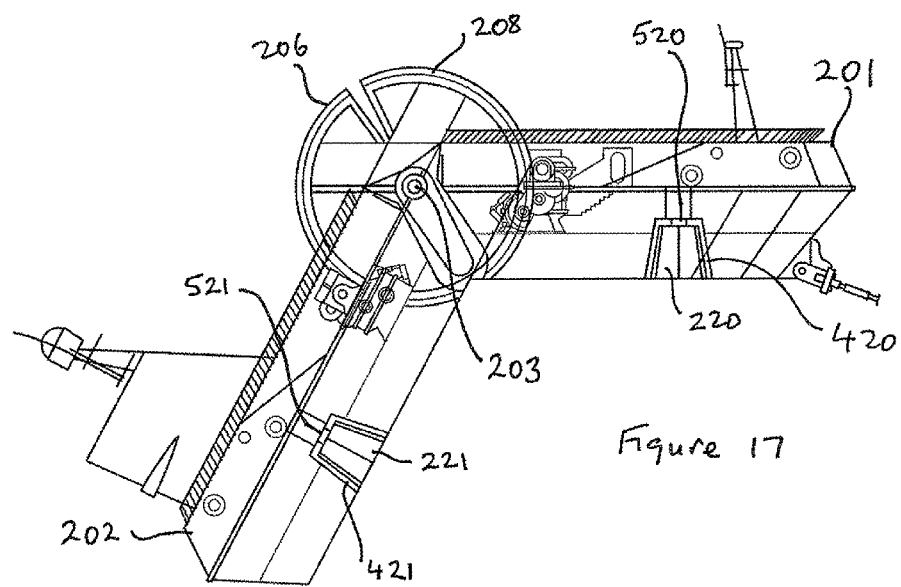
FIGS. 17 and 18 are schematic views of the apparatus of the Fig. in use.
Figure 18:
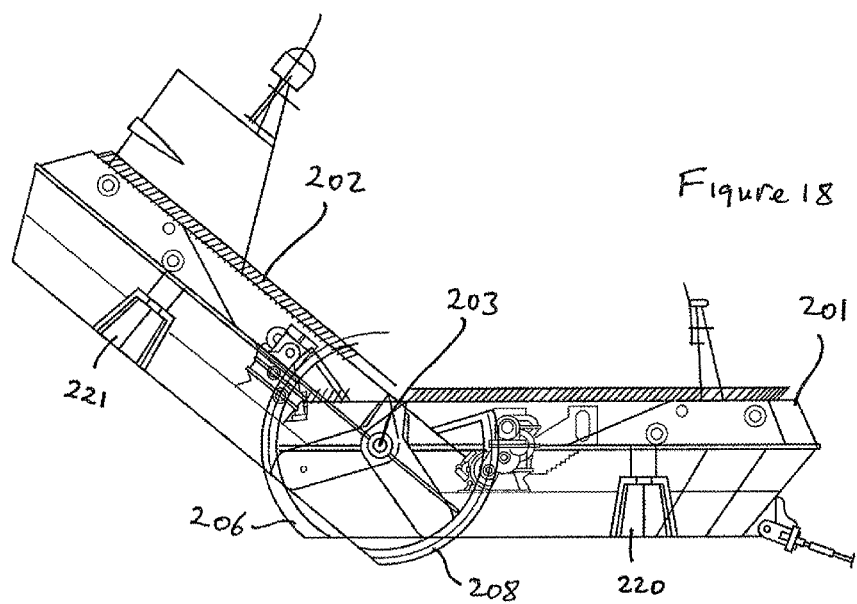

In a scenario where the device is reacting to wave activity of certain preconditions, of approximately 2 meters and 8 seconds, the spool input shaft will be rotating at an average speed of 10 rpm and the spool core circumference will measure 6 meters and when rotating at 10 rpm will wind the cable 14 at a linear rate of 1 meter per second. FIG. 16 shows the spool 302 with the cable 14 and weight 220 attached in a format in which it may be connected on each hull.

It is envisaged that certain limits (FIGS. 17, 18) may be placed on the angular pivotal movement of the forward hull section vis-à-vis the rear hull section 202 and such limits may be dependent on the arc of the gear segments 206, 208 which may be designed depending on the size of waves encountered in a particular location.

It is also envisaged that as energy is being stored by the raising of one of the weights 220, 221, the other of the weights will be lowered to generate electricity via the generator 304 which will be connected to the grid in a suitable manner.

A regenerative system to moderate the descent of the weight, during energy release may be provided and suitable electronic management may be provided to control the power output and to facilitate a change over system to bring the generator on each hull 201, 202 online and in phase during the operational sequence. A supply of compressed air will be required to control the cycle of clutch and the brake systems. Suitable compressors will therefore be provided on board to provide the necessary compressed air supply as desired.

The invention claimed is:

1. An apparatus for converting wave energy into electrical energy comprising
   a first floating hull (201) interconnected to a second floating hull (202),
   a winch mechanism (302) on at least one of the first and second hulls for raising a weight (220) suspended on a cable (14), said winch mechanism being operated in response to movement of said first hull (201) relative to said second hull (202), and
   a generator (304) driven by the downward movement of the weight (220).

2. An apparatus as claimed in claim 1 wherein the first hull (201) and second hull (202) are pivotally interconnected.

3. An apparatus as claimed in claim 2 wherein the winch mechanism (302) is operable to raise the weight (220), when the hulls pivot relative to each other, in both upward and downward directions.

4. An apparatus as claimed in claim 3 wherein a drive mechanism (301) is provided to operate a drive shaft (250) in one direction to raise the weight (220) in response to relative movement of the first and second hulls (201, 202).

5. An apparatus as claimed in claim 2 wherein the first and second hulls (201, 202) are pivotally connected by a link shaft (203).

6. An apparatus as claimed in claim 1 wherein the first hull (201) has a gear segment (206) which engages with a gear pinion (211) on the second hull (202).

7. An apparatus as claimed in claim 6 wherein the first hull (201) has a gear segment (206) and a gear pinion (209) for engaging with a corresponding gear pinion (211) and gear segment (208) on the second hull (202).

8. An apparatus as claimed in claim 7 wherein each gear segment (206, 208) has an arc of approximately 110°.

9. An apparatus as claimed in claim 7 wherein the gear pinion (209, 211) on each of the first and second hulls (201, 202) is disposed on a front face (212) of the hull.

10. An apparatus as claimed in claim 6 wherein the gear segment (206) is mounted on a flange (205) which projects from the first hull (201).

11. An apparatus as claimed in claim 6 wherein the gear segment (206) has an arc of approximately 110°.

12. An apparatus as claimed in claim 1 wherein the weight (220) on one hull is raised, as a weight (221) on the other hull is lowered to operate the generator (304).

13. An apparatus as claimed in claim 1 wherein each of the first and second hulls (201, 202) has a recess for accommodating the weight (220, 221).

14. An apparatus as claimed in claim 1 wherein each of the first and second hulls (201, 202) comprises an upper deck (A) and a lower deck (B).

15. An apparatus as claimed in claim 14 wherein at least the generator (304) is disposed on the upper deck (A).

16. A method for converting wave energy into electrical energy comprising providing a first floating hull (201) interconnected to a second floating hull (202), and a winch mechanism (302) for raising a weight (220) suspended on a cable (14), said winch mechanism (302) being operated in response to movement of said first hull (201) relative to said second hull (202), and a generator (304) driven by the downward movement of the weight (220).

* * * * *